United States Patent [19]

Lehureau

[11] 4,275,428
[45] Jun. 23, 1981

[54] MULTITRACK MAGNETIC READING HEAD

[75] Inventor: Jean-Claude Lehureau, Paris, France

[73] Assignee: Thomson-CSF, Paris, France

[21] Appl. No.: 101,503

[22] Filed: Dec. 10, 1979

[30] Foreign Application Priority Data

Dec. 8, 1978 [FR] France .................. 78 34648

[51] Int. Cl.³ .................. G11B 5/30; G11B 5/38; G11B 5/28
[52] U.S. Cl. .................. 360/113; 360/112; 360/121; 360/123
[58] Field of Search .............. 360/113, 112, 123, 125, 360/121, 127; 338/32 R, 32 H

[56] References Cited

U.S. PATENT DOCUMENTS

| | | | |
|---|---|---|---|
| 3,443,036 | 5/1969 | Maass | 360/112 |
| 3,493,694 | 2/1970 | Hunt | 360/113 |
| 3,668,670 | 6/1972 | Andersen | 360/112 |
| 3,887,944 | 6/1975 | Bajorek et al. | 360/113 |
| 3,986,210 | 10/1976 | Sugaya et al. | 360/123 |
| 4,001,890 | 1/1977 | Kayser | 360/113 |
| 4,184,631 | 1/1980 | Lazzari | 360/113 |
| 4,186,481 | 2/1980 | Noguchi | 360/112 |

*Primary Examiner*—Alfred H. Eddleman
*Attorney, Agent, or Firm*—Oblon, Fisher, Spivak, McClelland & Maier

[57] ABSTRACT

An integrated, multitrack, magnetic reading head in which a Hall effect or magneto-resistive material strip is deposited on a silicon substrate. The voltages produced in this strip are sampled by a group of amplifiers for the parallel-charging of a charge-coupled device, which is then read in series to obtain the output signal. Lateral tracks energize circuits making it possible by means of two resistive lines and a system of comparators to open the input gates of the charge-coupled device in order to correct the skew of the reading head.

4 Claims, 4 Drawing Figures

MULTITRACK MAGNETIC READING HEAD

BACKGROUND OF THE INVENTION

The present invention relates to magnetic reading heads making it possible to read a recording made on a magnetizable medium, such as a tape covered with a coating of iron oxide.

It is known to make magnetic reading heads by using a magnetic ring provided with an air gap and a coil. The magnetic tape travels in contact with the air gap and the particles magnetized in a variable manner and supported by the same induce in the magnetic ring a flux which leads to the appearance of read-out signals at the terminals of the coil. The pass band of these signals is linked to the magnetic tape speed and in order to record television signals it is necessary to wait for relative head/tape speeds of the order of 5 m/s. As a result it is necessary to use in video tape recording equipment a complex mechanical system to obtain a recording track formed from parallel segments inclined with respect to the axis of the tape and extending between its two edges. For this purpose two mechanical movements are formed, namely a conventional longitudinal movement of the magnetic tape and a transverse movement of the head.

BRIEF SUMMARY OF THE INVENTION

The object of the invention is to eliminate this transverse movement so that it is only necessary to have a longitudinal movement of the magnetic tape at a reduced speed of the order of 10 cm/s. For this purpose each of the segments is read with a system of superimposed elementary heads, each of which reads one point of the segment.

Such a system cannot be produced with the technology described hereinbefore, mainly due to the too small dimensions necessary for magnetic rings and coils, as well as the too high magnetic leaks between the rings.

The invention therefore relates to a magnetic head comprising a system of magnetoelectric transducers, called magneto-sensitive contacts which fulfil the function of said elementary heads and circuits which make it possible to store the read-out signals for reading them in parallel and restoring them in series. This head is produced by integration processes used in the semiconductor art.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

In the embodiment described the dimensions and sensitivity of the magneto-sensitive contacts, as well as the integration density of the circuits make it possible to obtain a head able to read 600 points spaced by 10 µm and distributed over an approximately 6 mm segment. This segment can therefore be perpendicular to the axis of a standard 6.35 mm wide magnetic tape. Such a resolution makes it possible to print out in such a segment the information contained in a line of a colour television picture, whereby the latter corresponds to a sound signal sample accompanying said picture and taken during the duration of said line.

Figure 1:
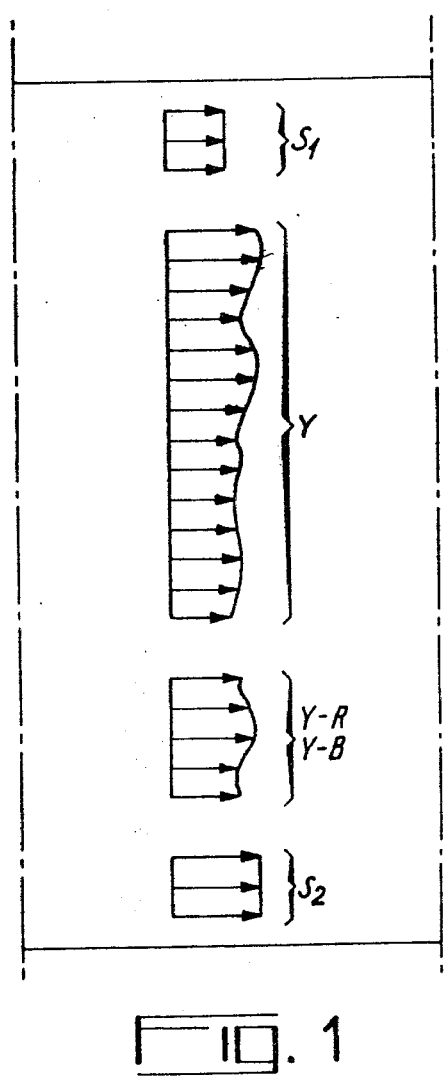
FIG. 1 symbolically the signal recorded on a piece of magnetic tape.

FIG. 1 symbolically shows the magnetic field along a segment which has been separated for the requirements of the drawing on a piece of magnetic tape defined by two dot-dash lines. This field is represented in the form of arrows having variable dimensions corresponding to the tracks traversed by the magneto-sensitive contacts. However, the number of arrows is considerably reduced compared with the number of contacts in order to make the drawing legible. Thus, from top to bottom there are firstly 25 tracks (3 arrows) making it possible to record a first sound signal $S_1$. This large number of tracks makes it possible to obtain a large signal/noise ratio, which is necessary due to the large dynamic ratio of the sound signals compared with video signals. In the present embodiment the sound signal modulates in amplitude a line frequency carrier recorded directly on the tape and these 25 signals are identical. However, it would also be possible to use other systems, such as for example a digitization of the sound signal and the recording in parallel on the tracks of the digital words obtained.

There are then 400 tracks (14 arrows) making it possible to record the luminance signal Y of one line of a picture. It should be noted that in this way along the said 400 tracks on the magnetic tape there is a succession of "magnetic images" representing the images of the television signal.

There are then 150 tracks (5 arrows) making it possible to alternately record as a function of the segments the colour difference signals Y-R and Y-B serving to reconstitute in the reader a colour image using known processes for sequential systems in colour television technology. It is advantageous to separate the recording of the chrominance and luminance signals, because the recording of a composite video signal requires more reduced tolerances as regards linearity and intermodulation.

There are then 25 tracks (3 arrows) making it possible to record a second sound signal, making it possible for example to carry out stereophonics or simultaneous translation.

These groups of tracks are separated from one another by approximately 70 µm hold intervals, which ensure that there is no mixing of the signals during the inevitable oscillating movements of the tape, so that the latter only cause an imperceptible signal loss and not intolerable mixtures, such as sound in the image.

The reading head according to the invention does not permit the recording of such a magnetic tape. Different processes can be used for effecting such a recording. For example it is possible to use a magneto-optical system as described in U.S. Pat. No. 3,228,015, granted on Jan. 4th 1966 in the name of J. J. MIYATA et al. In such a system the magnetic coating is brought beyond the Curie point by means of a light beam, so that on cooling there is a change in the magnetization direction of the heated point. The use of a light beam also makes it possible to obtain on the one hand a read-out trace having the desired small dimensions and on the other hand a suitable read-out speed. It is easy to use four separate beams for recording the two sound signals, the luminance signal and the chrominance signal.

Different materials can be used for the manufacture of the magneto-sensitive contacts. A first category of materials comprises magneto-resistive materials such as Permalloy. A bar of dimensions $L \times l \times e = 6$ mm $\times 5$ $\mu$m $\times 0.15$ $\mu$m is magnetized spontaneously in the longitudinal direction. This magnetization is deflected by 90° under the action of the 300 Oe field applied in the direction of the depth $l_1$, which leads to a resistivity variation of approximately 1/100. To obtain a good linearity it is possible to use a field varying by $\pm 100$ Oe about a polarization value equal to 150 Oe. Under these conditions in the case of a current injected in the direction of the length L with a density of $3.10^6$ A/cm$^2$, the resistivity variation between two electrodes spaced by 6 $\mu$m (to have a clearance between the read-out points positioned every 10 $\mu$m) is 0.5 $\mu\Omega$/cm, which gives a useful peak-to-peak signal of 1 mV at the output from the contact.

A second category of materials comprises those making it possible to use the Hall effect, i.e. essentially semiconductors such as indium antimonide and ferroelectric materials, such as alloys of cobalt and gadolinium.

For an indium antimonide bar of dimensions $L \times l \times e = 6$ mm $\times 5$ $\mu$m $\times 1$ $\mu$m subject to a 200 V/cm electrical field in the direction of length L and traversed by a current of 25 mA in the direction of said length, a sensitivity of 50 $\mu$V/Oe is obtained. In the case of a cobalt/gadolinium alloy bar the sensitivity is 3.5 $\mu$V/Oe.

The active field in the magnetic tape must be oriented differently, depending on the material used. Thus, in the case of magneto-resistive materials it must be perpendicular to the tape, whereas for those using the Hall effect it must be parallel thereto and longitudinally directed. This causes no difficulties and is obtained by orienting in an appropriate manner during manufacture using a polarization field the magnetic particles which form the sensitive coating. The magnetic recording field is then applied to the desired direction in accordance with the reading head provided and can develop in this direction, because the particles will have been appropriately oriented.

Figure 2:
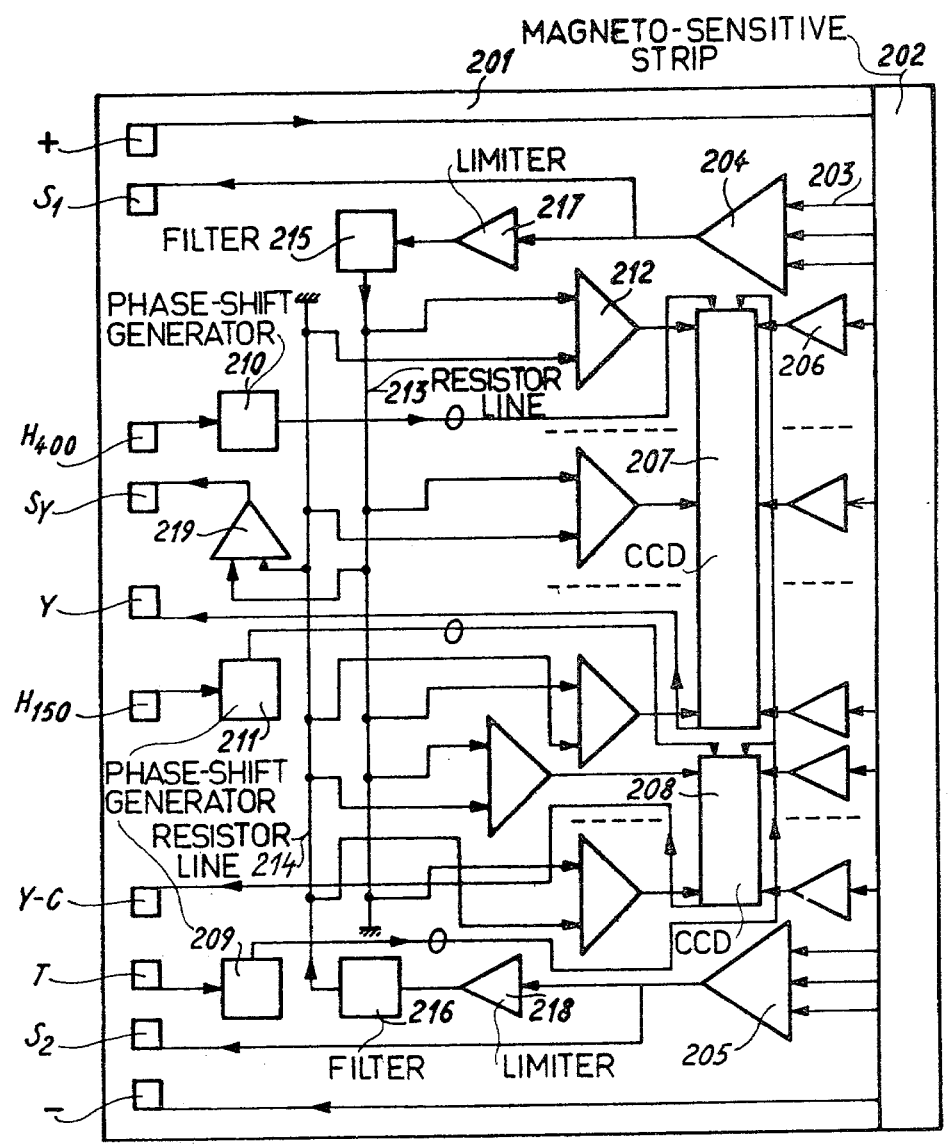
FIG. 2 the diagram of a reading head according to the invention.

A reading head using a bar of indium antimonide is shown in FIG. 2, which is only a partial representation and high symbolic for reasons of clarity. Thus, only a limited number of reading points and corresponding members such as circuits are shown in the form of symbols, whilst the connections are indicated by arrows. Certain ancillary members such as supply connections are not shown.

This head is produced on a $7 \times 4$ mm silicon wafer 201, which forms the substrate. The wafer is covered by ionic deposition of a 1 $\mu$m thick indium antimonide coating, followed by the photo-engraving of said coating to obtain the magneto-sensitive strip 202, which extends all along the right side of the wafer and has a width of 5 $\mu$m. The various circuits described hereinafter are produced according to known processes in the field of integrated circuit manufacture. The connections of the head to the circuits of the reader are effected by square contact pieces positioned along the left side.

Between its two ends the strip is supplied with direct current by negative and positive contact pieces. The magnetic tape travels perpendicular to the plane of the wafer, in such a way that the edge of strip 202 just touches its surface. The magnetic field developed by the tape is therefore perpendicular to the plane of the strip and by Hall effect induces voltages reproducing the variations of the field recorded on the tape.

A system of connections such as 203 regularly distributed along the inner edge of strip 202 makes it possible to sample voltages—the distribution is the same as for the tracks defined in FIG. 1.

The 25 upper connections are joined to a first amplifier-adder 204 and the 25 bottom connections are joined to a second amplifier-adder 205. These two amplifiers supply respectively two output contact pieces $S_1$ and $S_2$ two line frequency carriers modulated in amplitude by the sound signals. These amplifiers, like those described hereinafter, have a capacitive input making it possible to eliminate the continuous component due to the continuous supply of strip 202.

The other 400 connections for the luminance and 150 connections for the chrominance are respectively connected to amplifiers such as 206, which make it possible to raise the level of the read-out signals to an appropriate value for acting on a charge-coupled device (CCD) and specifically to approximately 1 V.

The output signals of amplifiers 206 are applied to CCD 207 for the luminance and CCD 208 for the chrominance. These devices are charged in parallel and supply in series respectively the luminance signal at contact piece Y and the chrominance signal at contact piece Y-C. Such a series—parallel conversion is standard in the case of digital signals. It is also known in the case of analog signals for image scanners and is described more particularly on page 143, FIG. 28 in the work entitled "Charge-Coupled Devices: Technology and Applications", published by IEEE and carrying reference number 76-20887 of the U.S. Library of Congress. In the device described in the above work the input signals are luminous and induce charges by photoelectric effect. The transposition to obtain CCD 207 and 208 is immediate, because if the output connection of one of the amplifiers 206 is connected to a cell the charges are supplied by said connection instead of being produced in situ by photons.

It is pointed out that the manufacture of a CCD necessitates the use of metal-oxide-silicon or MOS technology. Although it is known to combine MOS technology for CCD and bipolar technology for amplifiers it is difficult to carry out. It is therefore preferable to produce the amplifiers on the basis of MOS technology, in the manner described by Alcira Yuhawa in an article entitled "All-MOS Differential Amplifier" published on pages 47 and 50 of no. 43, October 1976 of the Journal NEC Research and Development.

It is necessary to transfer the charges stored in the input cells of the CCD to the cells of series transfer strings of each of the CCD. Several methods can be used. In the present case a three phase transfer system is used, identical to that used for the series transfer along the CCD, but limited to a single transfer step. The necessary signals, well known in connection with CCD are processed in a circuit 209 under the control of an external synchronization pulse T, which arrives when the input cells are all charged or loaded. It is pointed out that the multiple connection by which the signals are cast from circuit 209 to CCD 207 and 208 is shown in the form of a single arrow carrying a ring, which indicates the multiplicity of conductors.

To obtain a directly usable video signal, to within the chrominance matrixing, it is necessary to empty the CCD for the duration of one line, less the line blanking interval, i.e. approximately 50 $\mu$s. For this purpose two timing signals are used, one of them H400 supplying 400 pulses per line and the other H150 supplying 150 pulses per line. These signals are respectively applied to circuits 210 and 211, similar to circuit 209 and which make it possible to process the three phase transfer signals used in the present realisation.

In actual fact the movement of a magentic tape is never strictly rectilinear and therefore the track segments always have a certain variable skew relative to strip 202.

To compensate this skew CCD 207 and 205 have in each case a system of analog gates (a single field effect transsistor being sufficient for this purpose), whereof each is connected between the output of one of the amplifiers 206 and the corresponding input cell of the CCD. A system of comparators, such as 212 makes it possible to individually open the gates as the point to be read on the tape passes in front of the corresponding reading point on strip 202. For this purpose the output of each of these comparators is connected to the control input of one of the gates.

These comparators transmit an opening signal when the difference of the voltages at their inputs changes direction. These inputs are respectively connected to two resistive lines 213 and 214, connected between the earth and respectively two signal generators 215 and 216. The potential varies in a linear manner along said lines between the generators and earth and is dependent on the phase difference between these signals, which are assumed to be identical with the exception of the phase displacement, supplied by the generators. On connecting the inputs of the same comparator as in the drawing at the same level on lines connected in opposite directions, so that the sum of the two distances of the connecting points from earth remains constant, the comparators are successively started up, some from top to bottom and others from bottom to top and in an interval of time, which varies as a function of the signal supplied by the generators.

To obtain a perfect compensation the generators must be relatively complex, but correct results can also be obtained with relatively simple circuits, as will be shown hereinafter.

The output signals of amplifiers 204 and 205 are the sum of the signals at their inputs. The latter are sinusoidal carriers at line frequency, modulated in amplitude by the same signal for each channel, in phase opposition with the recording and with a supplementary phase displacement on reading due to the skew between the tape and the head. Thus, at the output of amplifiers 204 and 205 respectively there are two amplitude-modulated sinusoidal carrier frequencies, whose phase swing compared with $\pi$ represents the said skew. To be able to use these signals they are amplified in two limiting amplifiers 217 and 218, which thus supply square wave signals. As circuits 215 and 216 are used two active filters making it possible to obtain substantially pure sinusoidal waves, free from their phase-displaced, modulated signals. Thus, on considering one of the comparators 212 connected at a standard distance $\alpha$ with respect to earth on line 213 and consequently at a distance $1-\alpha=\beta$ relative to earth on line 212, the sign change condition for the difference of the voltages for the switching of the comparator is expressed by:

$\alpha \sin \omega t < (1-\alpha) \sin [\omega(t-\Delta T)+\pi]$ i.e. $\alpha \sin \omega t + (1-\alpha) \sin \omega(t-\Delta T) < 0$ $\omega$ being the line frequency and $\Delta T$ the time lag of $S_2$ compared with $S_1$ due to the skew. When the skew is zero, i.e. $\Delta T = 0$ this inequation isproved, starting from the time origin and remaining in one cycle, for $t > \pi/\omega$ no matter what is $\alpha$. This means that, as is normally the case, all the comparators start up in the middle of reading a segment and stop at the end of this reading operation.

When the skew is not zero it cannot be such that reading is started at the top of the following segment prior to the completion of the reading of the bottom of the previous segment, which means that $\Delta T$ must be between $\pm \pi/\omega$. Thus, under these conditions this inequation is proved for $\alpha = 1$ as from $t = \pi/\omega$, which is normal, because the displacement is taken from a zero point for said value of $\alpha$. It is also proved for $\alpha = 0$ from $t = \pi/\omega + \Delta T$, which is also normal because this constitutes a condition at the limits. It is finally proved for $\alpha = 0.5$ from $$t = \frac{\pi}{\omega} + \frac{\Delta T}{2}$$

which shows that the skew correction is completely satisfactory, both in the centre and at the limits of the segment.

For other values of $\alpha$ the value of t is given by the following inequation, which is directly deduced from that given hereinbefore:

$$\sin \omega(t - \Delta T) + 2 \alpha \cos \omega (t - \frac{\Delta T}{2}) \sin \omega \frac{\Delta T}{2} < 0.$$

This relationship is not linear between t and $\alpha$, which shows that the correction is not perfect outside the three above points, but it is easy to graphically show that this relationship is monotonic for any value of the parameter $\Delta T$ in the previously defined interval. As it passes through the three points where the correction is completely satisfactory, the correction margin between these points is very small.

For slaving the reader drive motor it is possible in known manner to start from one of the signals $S_1$ or $S_2$, containing in each case a carrier, whose phase and frequency fluctuations reproduce the irregularities of the magnetic tape speed.

In the present embodiment the processing of signals $S_1$ and $S_2$ by circuits 215 to 218 which has already taken place is utilised. Thus, as has been stated hereinbefore, at the output of these circuits there are the two carrier frequencies free from their modulations. As stated hereinbefore the linearity variation of the skew correction is zero at the centre of lines 213 and 214. Furthermore, as the signals at these points represent linear speed variations at the centre of the tape, the influence of the oscillating movements is considerably reduced on these signals, which is of interest because these movements are essentially due to the kinematics of the reader and cannot be corrected by action on the motor. Thus, the signals taken in the centre of lines 213 and 214 are summated in an amplifier 219, which supplies a pure carrier frequency at output contact piece SY.

To obtain a complete head a set of connecting wires are fixed to the contact pieces of the wafer, after which the latter is inserted between two blocks which on the one hand form a case and on the other have a guidance face for the magnetic tape. The strip of magnetosensitive material touches on the said face the edge of the slot formed by joining the two blocks, making it possible to read the tape when it passes over the guidance face.

Figure 3:
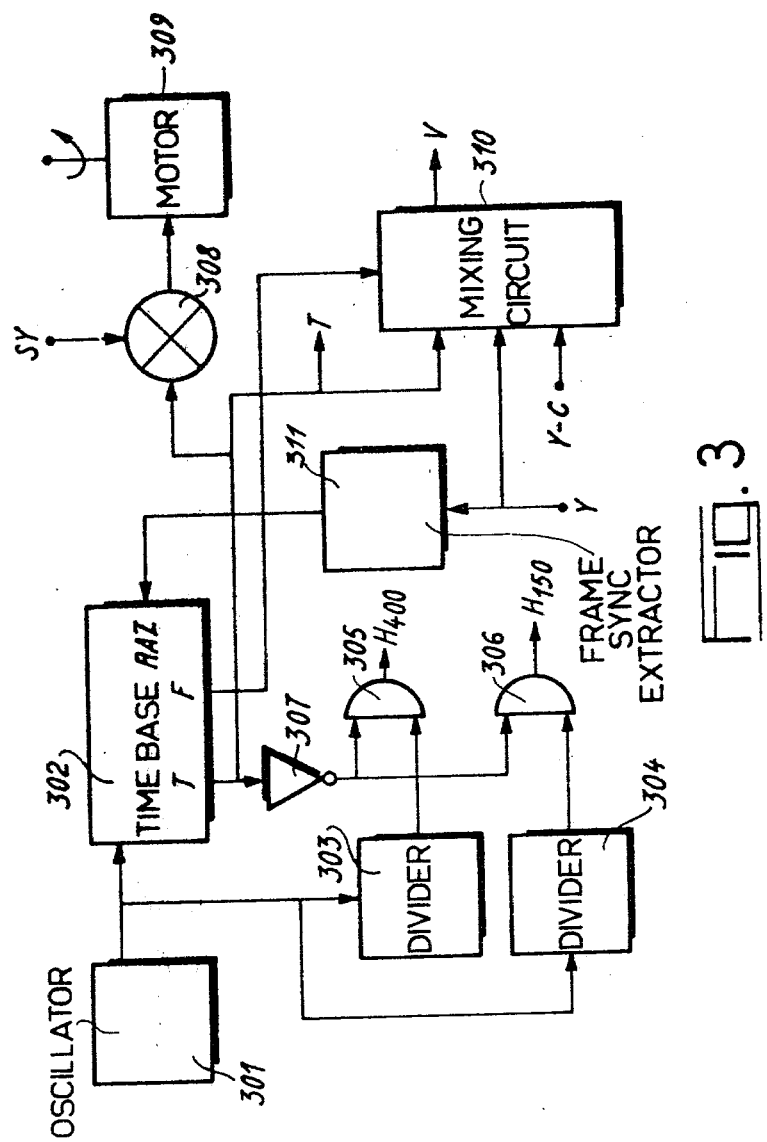
FIG. 3 a partial diagram of a magnetic reader provided with such a reading head.

The reader equipped with said head comprises a conventional feed mechanism and a conventional processing logic. It also comprises circuits connected to the reading head and whose block diagram is shown in FIG. 3.

A master oscillator 301, for example a quartz oscillator, supplies a timing signal with a time base 302 and of known type, which makes it possible to supply to two outputs line synchronization pulses T and frame synchronization pulses F. This timing signal is also applied to dividers 303, and 304, making it possible to obtain other timing signals at the frequencies necessary for emptying CCD 207 and 208. These timing signals are applied respectively to two gates 305 and 306. The line synchronization pulses T are inverted in an inverter 307, making it possible to obtain a signal which opens gates 305 and 306 between the line pulses in such a way that gate 305 supplies displacement pulses to a connection connected to contact piece $H_{400}$ between two line pulses 400 and gate 305 during the same time supplies 150 other displacement pulses to a connection connected to contact piece $H_{150}$.

The line synchronization pulses T are also applied to a connection connected to contact piece T, making it possible to charge CCD 207 and 208 at the start of the line.

In order to maintain reading synchronization pulses T are also applied to a phase comparator 308, whose other input is connected to contact piece SY. This comparator supplies an error signal which controls the motor 309 of the reader. Thus, when the speed of motor 309 is stabilized the line synchronization pulses are in phase with the sound carriers, which are themselves in phase with the line pulses corresponding to the recorded video signal, which permits synchronization of the reading.

In order to obtain a composite video signal a mixer circuit 310 of the type used in television broadcasting equipment, such as electronic cameras is employed. This circuit receives the luminance signal Y, the chrominance signal Y-C and the line T and frame F synchronization signals. It supplies a composite video signal V.

The synchronization provided by comparator 308 only relates to the lines. Frame synchronization is obtained by extracting from luminance signal Y signals which represent the start or finish of frames, e.g. frame blanking signals or any other characteristic signal introduced into Y at the recording stage. These signals are extracted in detector 311, which is also of a conventional type used in television broadcasting and is applied to an input RAZ of time base 302. Thus, they are able to ensure an initial readjustment of this time base and a subsequent maintenance of the adjustment between these signals and the frame synchronization pulses. F. The time base 302 ensures the short term stability of pulses F.

In the physical construction of the device shown in FIG. 2 the element whose dimensions impose the most constraints is CCD 207. It is possible to produce a CCD with a step of 10 μm, but it is easier to use 20 μm and under these conditions the CCD length exceeds that of line 202. Under these conditions a wafer 201 is used, whose height makes it possible to produce CCD 207 and 208 with the positioning shown and a broadening of the connections between the strip 202 and amplifiers 206 is obtained, whilst retaining the length imposed by the magnetic tape width for strip 202.

Another construction of the magneto-sensitive contacts comprises segmenting the strip 202 so as to give a system of segments, each of which corresponds to a contact point, whereby said segments are individually energized from two connecting assemblies connected respectively to the positive and negative contact pieces.

By using an already existing high resolution technology (minimum line width 3 μm) all the circuits of FIG. 2 can be placed on a $7 \times 4$ mm$^2$ wafer, thus bringing the reading head into the category of high integration circuits, which can be produced by existing technology.

Although only the case where the track segments are perpendicular to the magnetic tape axis has been described, the invention extends to the case where they are more or less inclined with respect to said axis, as a function of the tape width and of the maximum density of information along a segment. In this case the actual head is inclined to the tape axis.

A head of this type can also be used for digital information. In this case the CCD can be replaced by a standard digital technology shift register. If the CCD is retained for reasons of constructional simplicity, it is possible to simplify the construction of amplifier 206, because much more noise can be tolerated with respect to the signal level at the output and therefore at the inputs of the CCD.

What is claimed is:

1. A multitrack magnetic reading head for simultaneously reading on a magnetic tape of a group of parallel tracks recorded longitudinally on said tape, wherein it comprises:
   a substrate for the large scale integration of the elements of the head and having a rectilinear edge for bearing on the tape to be read;
   a magneto-sensitive strip deposited along said rectilinear edge for supplying a group of electrical signals under the action of said tracks;
   a first circuit for processing at least that electrical signal which corresponds to a first of the said tracks adjacent to one of the edges of the tape and for supplying a first pure sinusoidal signal;
   a second circuit for processing at least that electrical signal corresponding to the last of the said tracks adjacent to the other edge of the tape and for supplying a second pure sinusoidal signal, which is phase-displaced relative to the first sinusoidal signal, the phase variation between said two sinusoidal signals measuring the skew of the head relative to the tape;
   a system of amplifiers for respectively amplifying those electrical signals which are not processed in the first and second circuits to a level permitting the charging of a charge-coupled device;
   at least one charge-coupled device of the parallel-series type provided with a system of input gates for receiving in parallel via the said gates at least one group of electrical signals amplified by said amplifiers and restoring them to series form at the rate of a first timing signal;
   a first resistive line energized at one end by the first circuit;
   a second resistive line located parallel to the first resistive line and energised by the second circuit at its end opposite to the end of the first line energized by the first circuit; and
   a system of comparators connected to the resistive lines in a staggered manner for determining the sign change of the potential difference applied between the resistive lines by the first and second circuits and for successively opening the said input gates of the said charge-coupled device.

2. A reading head according to claim 1, wherein the first circuit permits the processing of a first group of electrical signals corresponding to a first system of contiguous tracks comprising the first track, whilst the second circuit permits the processing of a second group of electrical signals corresponding to a second system of contiguous tracks comprising the said last track.

3. A reading head according to claim 2, wherein it also comprises a second charge-coupled device of the parallel-series type provided with a system of second input gates for receiving in parallel via the said second gates a second group of electrical signals amplified by the amplifiers and for restoring them to series form at the rate of a second timing signal, the electrical signals of the first group of signals corresponding to a third system of contiguous tracks and the electrical signals of the second group of signals corresponding to a fourth system of contiguous tracks separate from the tracks of the third system of tracks.

4. A reading head according to claim 3, wherein it also comprises an amplifier-adder connected to the centre of the two resistive lines for supplying a signal representing the elementary speed of the magnetic tape which is read.

* * * * *